United States Patent [19]
Hamilton et al.

[11] Patent Number: 5,679,915
[45] Date of Patent: Oct. 21, 1997

[54] METHOD OF ASSEMBLING A HYBRID INFLATOR

[75] Inventors: Brian K. Hamilton, Littleton; James L. Baglini, Englewood, both of Colo.

[73] Assignee: OEA, Inc., Aurora, Colo.

[21] Appl. No.: 552,861

[22] Filed: Nov. 3, 1995

Related U.S. Application Data

[62] Division of Ser. No. 210,668, Mar. 18, 1994.
[51] Int. Cl.$^6$ .................... F42B 4/00; C06D 5/06
[52] U.S. Cl. .............. 86/20.1; 86/21; 102/288; 102/289
[58] Field of Search ............... 102/288, 289; 86/20.1, 21

[56] References Cited

U.S. PATENT DOCUMENTS

| | | | |
|---|---|---|---|
| 3,117,424 | 1/1964 | Hebenstreit | 62/48 |
| 3,163,014 | 12/1964 | Wismar | 62/48 |
| 3,636,881 | 1/1972 | Godfrey | 102/103 |
| 3,655,217 | 4/1972 | Johnson | 280/150 |
| 3,690,695 | 9/1972 | Jones, Sr. | 280/150 AB |
| 3,721,456 | 3/1973 | McDonald | 280/413 |
| 3,755,311 | 8/1973 | Zimmer-Galler | 149/60 X |
| 3,756,621 | 9/1973 | Lewis et al. | 280/150 AB |
| 3,774,807 | 11/1973 | Keathley et al. | 222/3 |
| 3,788,667 | 1/1974 | Vancil | 280/150 AB |
| 3,822,895 | 7/1974 | Ochiai | 280/150 |
| 3,901,530 | 8/1975 | Radke | 280/150 AB |
| 3,948,540 | 4/1976 | Meacham | 280/150 AB |
| 3,960,390 | 6/1976 | Goetz | 280/731 |
| 3,966,225 | 6/1976 | Marlow | 280/737 |
| 3,966,226 | 6/1976 | Roth | 280/737 |
| 4,002,514 | 1/1977 | Plomer et al. | 149/36 |
| 4,050,483 | 9/1977 | Bishop | 141/4 |
| 4,115,999 | 9/1978 | Diebold | 60/219 |
| 4,131,300 | 12/1978 | Radke et al. | 280/737 |
| 4,408,534 | 10/1983 | Araki et al. | 102/288 |
| 4,533,416 | 8/1985 | Poole | 149/35 |
| 4,798,142 | 1/1989 | Canterberry et al. | 102/290 |
| 4,938,813 | 7/1990 | Eisele et al. | 149/19.2 |
| 4,948,439 | 8/1990 | Poole et al. | 149/46 |
| 5,016,914 | 5/1991 | Faigle et al. | 280/741 |
| 5,022,674 | 6/1991 | Frantom et al. | 280/741 |
| 5,031,932 | 7/1991 | Frantom et al. | 280/741 |
| 5,060,974 | 10/1991 | Hamilton et al. | 280/736 |
| 5,062,365 | 11/1991 | Canterberry | 102/290 X |
| 5,125,684 | 6/1992 | Cartwright | 280/736 |
| 5,131,680 | 7/1992 | Coultas et al. | 280/737 |
| 5,160,163 | 11/1992 | Castagner et al. | 280/740 |
| 5,184,846 | 2/1993 | Goetz | 280/736 |
| 5,199,740 | 4/1993 | Frantom et al. | 280/736 |
| 5,230,531 | 7/1993 | Hamilton et al. | 280/737 |
| 5,263,740 | 11/1993 | Frey et al. | 280/737 |
| 5,316,600 | 5/1994 | Chan et al. | 149/19.4 |
| 5,346,252 | 9/1994 | Levosinski | 280/740 |
| 5,348,344 | 9/1994 | Blumenthal et al. | 280/737 |
| 5,351,989 | 10/1994 | Popek et al. | 280/737 |
| 5,360,232 | 11/1994 | Lowe et al. | 280/741 |
| 5,411,290 | 5/1995 | Chan et al. | 280/737 |
| 5,423,570 | 6/1995 | Kort et al. | 280/736 |
| 5,429,691 | 7/1995 | Hinshaw et al. | 149/45 |
| 5,439,537 | 8/1995 | Hinshaw et al. | 149/22 |
| 5,441,302 | 8/1995 | Johnson et al. | 280/736 |

FOREIGN PATENT DOCUMENTS

| | | |
|---|---|---|
| 0 520 104 A1 | 6/1991 | European Pat. Off. |
| 0 592 119 A2 | 4/1994 | European Pat. Off. |

*Primary Examiner*—Peter A. Nelson
*Attorney, Agent, or Firm*—Sheridan Ross, P.C.

[57] ABSTRACT

A hybrid inflator for an automotive inflatable safety system and method for assembling the same. In one embodiment, a mixture of an inert gas (e.g., argon) and oxygen are contained within the inflator housing and a gun type propellant is used in the gas generator to supply the propellant gases.

7 Claims, 2 Drawing Sheets

5,679,915

METHOD OF ASSEMBLING A HYBRID INFLATOR

RELATED APPLICATIONS

This application is a divisional of U.S. patent application Ser. No. 08/210,668 filed Mar. 18, 1994.

FIELD OF THE INVENTION

The present invention generally relates to the field of automotive inflatable safety systems and, more particularly, to hybrid inflators which utilize both a stored, pressurized gas and a gas generating propellant.

BACKGROUND OF THE INVENTION

The evolution of inflators for automotive inflatable safety systems has resulted in the development of pressurized gas only inflators, propellant only inflators, and hybrid inflators. Hybrid inflators utilize a combination of a stored, pressurized gas and gas generating propellant to expand the air/safety bag. There are of course many design considerations for of each of these types of inflators. In all three systems, two primary design considerations are that the air/safety bag must be expanded a predetermined amount in a predetermined amount of time in order to be operationally effective. Moreover, since the gas within the expanded air/safety bag eventually permeates through the air/safety bag and is discharged to atmosphere, the effect of the gases upon occupants of the automobile is important.

With further regard to the effect of the gases upon the occupants, for instance it is desirable to have the gases within the air/safety bag be below a certain toxicity level. U.S. Pat. Nos. 3,690,695; 3,788,667; and 3,966,226 generally address this issue. Moreover, the appearance of the gases is important. As an example, one problem with current state-of-the-art hybrid inflators is that they produce, in the gas output stream, copious quantities of metal salt fumes (e.g., potassium chloride). This salt is present because an oxygen source must be added to the propellant formulation to minimize carbon monoxide production by oxidizing all carbon in the propellant to carbon dioxide. This salt fume is highly objectional in a crash situation because it has both physiological and psychological effects, imposed in a time of great physical and psychological stress. The salt fume in the post-crash automobile cabin drastically reduces visibility for the crash victims, and creates anxiety over the possibility of fire. Current hybrid inflators use propellants which typically contain more than 70% potassium perchlorate, which yields about 54% of the propellant weight as potassium chloride fume.

Since the weight of the automobile is an important design consideration in many instances today, so to then is the weight of the inflator. Moreover, due to the limited space available in many automotive designs, the size of the inflator is also an important design consideration. These types of factors have effectively rendered pressurized gas only inflators obsolete. Moreover, in propellant only and hybrid inflators, these types of considerations have resulted in many changes to the structure of the inflator and the materials selected for use in this structure. However, little consideration has been given to the propellant to achieve a certain weight reduction.

Although the performance of a given inflator will of course influence the manufacturer's/supplier's position in the marketplace, system performance alone is no longer dispositive. That is, since inflatable safety systems are now being included in a large number of automobiles which will likely increase the number of manufacturers/suppliers of inflators, minimizing the cost of the inflator is becoming increasingly important to obtaining a competitive advantage. Consequently, it would be desirable to not only provide an inflator with competitive performance characteristics, but which is also cost competitive.

SUMMARY OF THE INVENTION

The present invention is generally directed to a hybrid inflator for an automotive inflatable safety system. That is, the invention relates to an inflator which utilizes both a stored, pressurized gas and a gas generating propellant. More specifically, the various aspects of the present invention are embodied in a hybrid inflator which uses propellants which produce large amounts of carbon monoxide and hydrogen. This would normally be unacceptable in an inflator for an automotive inflatable safety system. However, these combustion products are converted to harmless carbon dioxide and water vapor by oxygen which is used as at least part of the stored, pressurized gas of the hybrid inflator. This stored oxygen eliminates the need for an oxygen source (e.g., potassium perchlorate) in the propellant formulation, and thereby eliminates the largest source of objectionable particulate fume production in the inflator. This reaction of carbon monoxide and hydrogen produced by the propellant with the oxygen stored in the inflator as a gas also greatly enhances the heating value of the propellant, thereby minimizing the amount of propellant required.

One aspect of the present invention is directed toward a hybrid inflator which utilizes a gun type propellant in the gas generator for generating the propellant gases. Gun type propellants, as used herein, are high temperature, fuel-rich propellants such as single, double, or triple-base propellants, and nitramine propellants such as LOVA or HELOVA propellants. More specifically, gun type propellants are those having a combustion temperature ranging from about 2500 K. to about 3800 K., and typically greater than about 3000 K., and are fuel-rich in that without excess oxygen, these propellants generate significant amounts of CO and $H_2$. The excess of fuel from these propellants typically requires additional oxygen between 15 and 40 mole percent to drive the equilibrium to $CO_2$ and $H_2O$. One particular propellant which has performed desirably is an M39 LOVA propellant available from the Naval Ordnance Station in Indianhead, Md. and Bofors in Europe. This particular propellant, without the excess oxygen, generates about 32 mole percent CO and about 30 mole percent $H_2$. However, the M39 LOVA propellant does satisfy current U.S. automotive industry tests relating to propellants (e.g., it does not degrade sufficiently to severely impact performance when exposed to a temperature of 107° C. for a period of 400 hours). In contrast, many if not most existing double-base propellants cannot meet this standard partly because they contain nitrocellulose as a major ingredient. Therefore, M39 LOVA propellants are preferred over existing double-base propellants with regard to the present invention, although a further improvement to completely eliminate nitrocellulose from M39 LOVA would be desirable.

With regard to this initial aspect of the present invention, it may be desirable to utilize multiple stored gases within the inflator housing. For instance, one of the gases may be an inert gas such as argon and may comprise a majority of the stored gas, while the other gas may be oxygen. Argon has advantages such as that it is relatively inexpensive, inert, has a relatively large molecule and thus is relatively easy to store at a high pressure (e.g., 3,000 psi) for an extended period of time, and has a low heat capacity. Oxygen is advantageous in that it will react with the propellant gases and provide multiple functions. Initially, this reaction generates heat which further contributes to the expansion of the argon by the propellant gases which allows for using reduced amounts of propellant. Moreover, the noted reaction may reduce the toxicity of the propellant gases by driving the reaction equilibrium to $CO_2$ and $H_2O$. This use of multiple gases for the stored, pressurized gas in the hybrid inflator may also provide benefits when used with other propellants.

Another aspect of the present invention is directed toward a method for assembling a hybrid inflator. The method generally includes the steps of positioning a gun type propellant in the gas generator, interconnecting the gas generator and inflator housing, introducing a first gas into the inflator housing, introducing a second gas into the inflator housing which is different from the first gas, and sealing the inflator housing to retain the first and second gases therein. In this aspect, the amounts of gun type propellant and the size and weight of the inflator may be as noted above. Moreover, in this aspect the first gas may be argon and the second gas may be oxygen, with the argon being about 70% to about 90% of the stored gas in the inflator housing on a molar basis and the oxygen being about 10% to about 30% on a molar basis. Stoichiometrically, a lesser amount of oxygen is actually required, but for reasons of kinetics a significant excess over stoichiometric is required to react with the objectionable gases. This multiple gas configuration provides the above-noted advantages, and may also be beneficial to use with other propellants.

DETAILED DESCRIPTION

The present invention will be described with regard to the accompanying drawings which assist in illustrating various features of the invention. In this regard, the present invention generally relates to hybrid inflators for automotive inflatable safety systems. That is, the invention relates to an inflator which utilizes both a stored, pressurized gas and a gas generating propellant. Various types of hybrid inflators are disclosed in U.S. Pat. No. 5,230,531 to Hamilton et al. which is assigned to the assignee of this application, and the entire disclosure of this patent is hereby incorporated by reference in its entirety herein.

Figure 1:
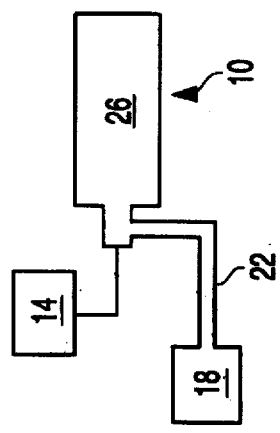
FIG. 1 is a schematic representation of an automotive inflatable safety system.

One embodiment of an automotive inflatable safety system is generally illustrated in FIG. 1. The primary components of the inflatable safety system 10 include a detector 14, an inflator 26, and an air/safety bag 18. When the detector 14 senses a condition requiring expansion of the air/safety bag 18 (e.g. a predetermined deceleration), a signal is sent to the inflator 26 to release gases or other suitable fluids from the inflator 26 to the air/safety bag 18 via the conduit 22.

Figure 2:
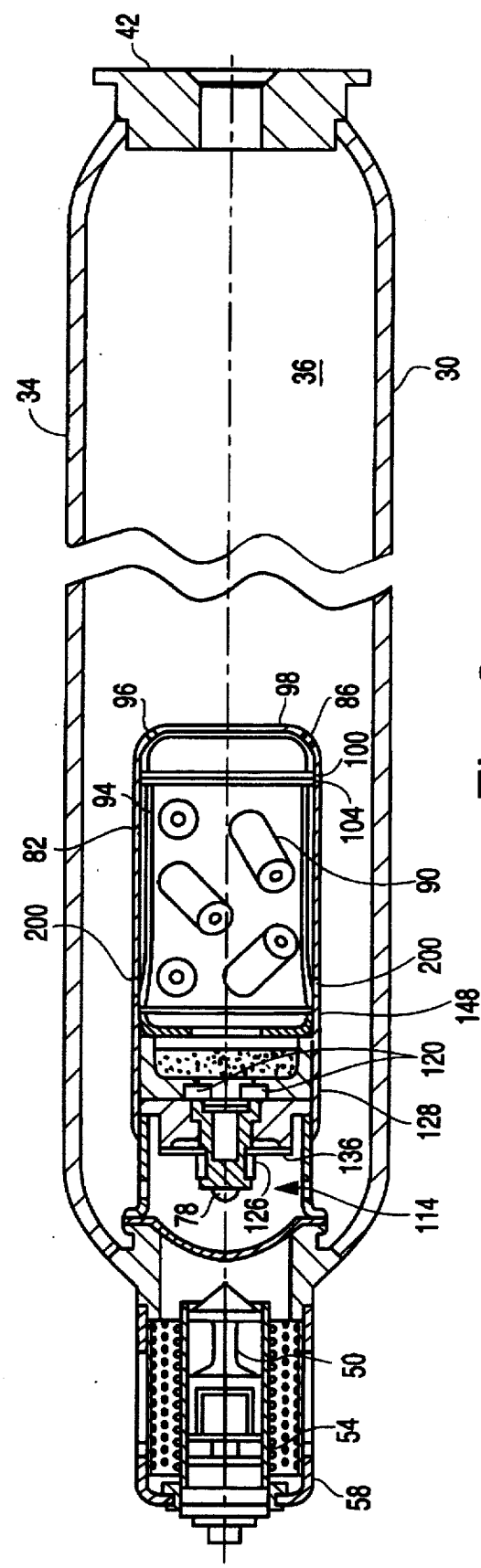
FIG. 2 is a longitudinal cross-sectional view of a hybrid inflator which may incorporate one or more principles of the present invention.

The inflator 30 illustrated in FIG. 2 is a hybrid inflator and may be used in the inflatable safety system 10 of FIG. 1 in place of the inflator 26. Consequently, the inflator 30 includes a bottle or inflator housing 34 having a pressurized medium 36 that is provided to the air/safety bag 18 (FIG. 1) at the appropriate time, as well as a gas generator 82 that provides propellant gases to augment the flow to the air/safety bag 18 (e.g., by providing heat to expand the pressurized medium 36). As will be discussed in more detail below, it has been determined that it is desirable to utilize a gun type propellant as defined above in the gas generator 82 and to utilize a mixture of one inert gas (e.g., argon) and oxygen for the pressurized medium 36.

The inflator housing 34 and gas generator 82 are interconnected, with the gas generator 82 being positioned inside the inflator housing 34 to reduce the space required for the inflator 30. More specifically, a hollow diffuser 38 is welded to one end of a hollow boss 66. The diffuser 38 has a plurality of rows of nozzles 40 therethrough which provides a "non-thrusting output" from the inflator 30 and a screen 58 is positioned adjacent the nozzles 40. A closure disk 70 is appropriately positioned within the boss 66 and is welded thereto in order to initially retain the pressurized medium 36 within the inflator housing 34. When release is desired, a projectile 50 having a substantially conically-shaped head is propelled through the closure disk 70. More particularly, the projectile 50 is positioned on the convex side of the closure disk 70 within a barrel 54 and is propelled by the activation of an initiator 46 when an appropriate signal is received from the detector 14 of the inflatable safety system 10 (FIG. 1). A ring 62 is provided to initially retain the projectile 50 in position prior to firing.

An orifice sleeve 74 is welded to the closure disk 70 and/or the end of the boss 66. The orifice sleeve 74 is hollow and includes a plurality of orifice ports 78 to fluidly interconnect the interior of the inflator housing 34 and the interior of the boss 66 and diffuser 38 when the closure disk 70 is ruptured by the projectile 50. Moreover, the gas generator 82, more specifically the gas generator housing 86, is welded to the orifice sleeve 74 to complete the interconnection of the inflator housing 34 and gas generator 82.

The gas generator housing 84 contains a plurality of propellant grains 90 which when ignited provides propellant gases through the gas generator nozzle 98 for augmenting the flow to the air/safety bag 18 (FIG. 1). The propellant grains 90 are retained within the gas generator housing 86 by a propellant sleeve 94 which is separated from the gas generator nozzle 98 on the discharge end 96 of the gas generator housing 86 by a screen 104 and baffle 100. As will be discussed below, the propellant grains 90 in one aspect are composed of a gun type propellant. In this case, the grains 90 are substantially cylindrically-shaped with a single hole extending through the central portion thereof. Other propellant grain configurations may be appropriate and will depend at least in part on the composition of the propellant.

The gas generator 82 includes an ignition assembly 114 for igniting the propellant grains 90 at the appropriate time. The ignition assembly 114 is at least partially positioned within the gas generator housing 86 between the projectile 50 and propellant grains 90 and generally includes an actuation piston 124, and at least one percussion primer 120 and an ignition/booster material 144 which serve as an activator. More particularly, an actuation guide 140 engages an end portion of the orifice sleeve 74 and the interior wall of the gas generator housing 86, the actuation guide 140 thereby functioning at least in part to contain at least a portion of and guide the actuation piston 124 positioned therein. A primer holder 116 engages an end of the actuation guide 140 and houses a plurality of conventional percussion primers 120 which are positioned substantially adjacent to the ignition/booster material 144. The ignition/booster material 144 is typically retained adjacent the primers 120 by a charge cup 148. A retainer 108 and baffle 112 are positioned between the primer holder 116 and propellant sleeve 94. In the event that the gas generator housing 86 is attached to the orifice sleeve 74 by crimping versus welding, the gas generator housing 86 may have a tendency to lengthen during operation. Consequently, in order to maintain a firm interaction of the foregoing components, a wave spring washer (not shown) may be positioned, for instance, between the retainer 108 and the baffle 112.

The actuation piston 124 is slidably positioned within the actuation guide 140 and includes a continuous rim projecting member 128 which is substantially aligned with the primers 120. As can be appreciated, a plurality of projecting members (not shown), could replace the substantially continuous rim projecting member 128. A belleville washer 136 is positioned between and engages a portion of both the actuation guide 140 and actuation piston 124 (via a spacer 126) to initially maintain the position of the actuation piston 124 away from the primers 120. Consequently, the potential for inadvertent engagement of the actuation piston 124 with the primers 120, which could activate the gas generator 82, is reduced. However, after the projectile 50 passes through the closure disk 70, the energy transferred to the actuation piston 124 by the projectile 50 is sufficient to overcome the belleville washer 136 such that the projecting rim 128 is able to engage the primers 120 with sufficient force to ignite at least one of such primers 120. This in turn causes ignition of the ignition/booster material 144, and thus ignition of the propellant grains 90.

During operation of the gas generator 82, the primers 120 may erode and thereby allow propellant gases generated by combustion of the propellant grains 90 to flow through the primers 120. Any leakage of propellant gases in this manner may adversely affect the consistency of performance of the inflator 30. These gases, however, desirably act upon the actuation piston 124 to move the piston 124 into sealing engagement with the actuation guide 140. This provides a seal for the gas generator housing 90 which substantially limits any leakage of gases therethrough. Therefore, the propellant gases desirably flow through the gas generator nozzle 98.

Summarizing the operation of the inflator 30, the detector 14 (FIG. 1) sends a signal to the initiator 46 to propel the projectile 50. The projectile 50 initially passes through the closure disk 70 to open the passageway between the inflator housing 34 and air/safety bag 18 (FIG. 1). The projectile 50 continues to advance until it impacts the actuation piston 124 which causes the projecting rim 128 attached thereto to strike at least one of the aligned primers 120. As a result, the ignition/booster charge 144 ignites, which in turn ignites the propellant grain 90. The resulting propellant gases exit the gas generator nozzle 98 positioned on the discharge end 96 of the gas generator housing 86 and flow into the inflator housing 34 to provide the desired function, that of augmenting the flow to the air/safety bag 18 (FIG. 1).

As noted above, the hybrid inflator 30 utilizes a gun type propellant composition for the propellant grains 90 and a mixture of an inert gas and oxygen for the pressurized medium 36. Initially, gun type propellants are defined above, that is propellants which have a high combustion temperature and which are fuel-rich. Specific gun type propellants which may be used for the propellant grains 90 of the hybrid inflator 30 include HPC-96, a double base, smokeless propellant having a composition, on a weight percentage basis, of about 76.6% nitrocellulose of which about 13.25% is nitrogen; about 20.0% nitroglycerin; about 0.6% ethyl centralite; about 1.5% barium nitrate; about 0.9% potassium nitrate; and about 0.4% graphite. HPC-96 is available from Hercules, Inc. in Wilmington, Del. LOVA propellants (low vulnerability ammunition) and HELOVA propellants (high energy, low vulnerability ammunition) may also be used for the propellant grains 90, such as a M39 LOVA propellant having a composition, on a weight percentage basis, of about 76.0% RDX (hexahydrotrinitrotriazine); about 12.0% cellulose acetate butyrate; about 4.0% nitrocellulose (12.6% nitrogen); about 7.60% acetyl triethyl citrate; and about 0.4% ethyl centralite. The M39 LOVA propellant is available from the Naval Ordnance Station in Indianhead, Md. and Bofors in Europe. The LOVA and HELOVA propellants are preferred over existing double-base propellants since they pass current U.S. automotive industry standards, whereas double-base propellants do not.

Due to the performance characteristics of gun type propellants when used for the propellant grains 90, together with the use of oxygen as a portion of the pressurized medium 36, it is possible to reduce the amount of propellant required for the gas generator 82 compared to current designs using, for example, FN 1061-10 available from the assignee of this patent application (FN 1061-10 has a composition, on a weight percentage basis, of about 7.93% polyvinyl chloride, 7.17% dioctyl adipate, 0.05% carbon black, 0.35% stabilizer, 8.5% sodium oxalate, 75% potassium perchlorate, and about 1% lecithin). For instance, when the desired gun type propellant composition is used for the propellant grains 90 the total grain weight may range from about 10 grams to about 12 grams, and is preferably less than about 15 grams. In this case, it is preferable to utilize between about 150 grams and about 190 grams of pressurized medium 36 with the oxygen being between about 10% to about 30% of this medium 26 on a molar basis. More specifically, when about 169 grams of the pressurized medium 36 is utilized, with about 15% of this on a mole percentage basis being oxygen, the total weight of the propellant grains 90 may be about 10.4 grams.

The above-identified reduction in the amount of propellant in accordance with the present invention in comparison to the above-identified FN 1061-10 propellant composition may be expressed as a ratio of the weight of the pressurized medium 36 to the total weight of propellant grains 90. With regard to the FN 1061-10 propellant, the assignee of this application presently uses a ratio of about 7.04 for the weight of argon (i.e., the stored gas and corresponding with the pressurized medium 36 associated with the present invention) to the weight of FN 1061-10 propellant. With regard to the present invention, the ratio of the weight of the pressurized medium 36 to the total weight of the propellant grains 90 ranges from about 10 to about 20, and more preferably from about 14 to about 18, and is most preferably greater than about 15. As can be appreciated, these ratios may be further increased by use of hotter propellants, which would require even less propellant. In this regard, because the output gases of propellants in accordance with principles of the present invention are essentially free of hot particulate matter, the inflator can produce output gases at a higher temperature than can a particulate-laden inflator such as current state-of-the-art hybrids. This increase in temperature will allow the inflator to be smaller and lighter still, since the hotter gas is relatively more expansive.

The above-identified reduction in the amount of propellants in accordance with the present invention in comparison to the above-identified FN 1061-10 propellant composition may also be expressed as a ratio of the gram moles of the total gas output (i.e., the combination of the propellant gases and the pressurized medium 36) to the total weight of the propellant grains 90. With regard to the FN 1061-10 propellant, the assignee of the application presently uses a ratio of about 0.192 gram moles/gram of propellant for the moles of the output gas to the weight of the propellant. In comparison and with regard to the present invention, the ratio of the moles of the output gas to the total weight of the propellant grains 90 ranges from about 0.35 gram moles per gram of propellant to about 0.6 gram moles per gram of propellant, more preferably from about 0.4 gram moles per gram of propellant to about 0.5 gram moles per gram of propellant and is most preferably about 0.5 gram moles per gram of propellant.

Weight reductions are of course realized by merely reducing the total weight of the propellant grains 90. However, this reduction in the amount of propellant also allows for a size reduction for the gas generator 82, and thus the weight of the gas generator 82. Consequently, the size of the inflator housing 34 can be similarly reduced. Therefore, the size of the entire inflator 30 may be reduced. Although various sizes of inflators may be used depending upon the application and/or design considerations, in comparison to using the above-identified FN 1061-10 propellant in a given inflator design, the propellants of the present invention allow for a size reduction typically of about 50% percent (and also a 50% weight reduction).

The use of multiple gases for the pressurized medium 36 allows for the use of a gun type propellant for the propellant grain 90. Generally, the pressurized medium 36 is composed of one inert gas and oxygen. Appropriate inert gases include argon, nitrogen, helium, and neon, with argon being preferred. The oxygen portion of the pressurized medium is multi-functional. Initially, the reaction of the oxygen with the combustion byproducts of the gun type propellant of the propellant grain provides a source of heat which contributes to the expansion of the inert gas. This allows at least in part for a reduction in the amount of propellant which is required for the gas generator 82. Moreover, the reaction of the oxygen with the combustion byproducts also reduces any existing toxicity levels of the propellant gases. For instance, the oxygen will convert existing carbon monoxide to carbon dioxide, existing hydrogen to water vapor, and unburned hydrocarbons will be similarly eliminated.

As noted, the amount of the one inert gas, on a molar basis, is between about 70% and about 90% and the amount of oxygen, on a molar basis, is between about 10% and about 30%. Generally, it is desirable to use an amount of oxygen in excess of that based upon theoretical conversions. However, it is also generally desirable to not have more than about 20% (molar) oxygen in the output gas (i.e., the combination of the propellant gases and the pressurized medium).

The inflator 30 may be assembled in the following manner. Initially, the gas generator 82 is assembled, such as by: 1) inserting the baffle 100 and screen 104 in the gas generator housing 86 adjacent the discharge end 96; 2) inserting the propellant sleeve 94 in the gas generator housing 86; 3) positioning the propellant grains 90 within the propellant sleeve 94; 4) inserting the baffle 100 and screen 104 in the gas generator housing 86 adjacent the end of the propellant sleeve 94; 5) inserting the primer holder 116, with the ignition/booster material 144 and charge cup 148, in the gas generator housing 86; and 6) inserting the actuation guide 140, belleville washer 136, and actuation piston 124 into the gas generator housing 86. Thereafter, the various parts are interconnected, such as by welding the gas generator housing 86 to the orifice sleeve 74, by welding the diffuser 38 to the boss 66 after positioning the projectile 50 and initiator 46 in the diffuser 38, welding the closure disk 70 between the boss 66 and orifice sleeve 74, and welding the boss 66 to the inflator housing 34. With the above structure in tact, the pressurized medium 36 may be introduced into the inflator housing 34. In this regard and in the case of multiple gases, the argon and oxygen may be separately introduced into the inflator housing 34 through the end plug 42 which is welded to the end of the inflator housing 34.

The following examples further assist in the description of various features associated with the present invention.

EXAMPLE 1

The above-noted HPC-96 propellant was used to form the propellant grains 90 having a total weight of 18 grams. Each propellant grain 90 had the configuration generally illustrated in FIG. 2, and had a length or thickness of about 0.52 inches, an outer diameter of about 0.29 inches, and a web thickness of about 0.105 inches (one-half of the difference between the inner and outer diameters of the propellant grain 90). Moreover, the HPC-96 propellant had the following properties when ignited in the presence of air: an impetus of 363,493 ft-lbs/lb; a heat of explosion of 1,062 calories/gram; a $T_v$ of 3490° K.; a molecular weight of the gases of 26.7 moles; a specific heat ratio of 1.2196; and a solid density of 1.65 grams/cubic centimeter. The gas composition, based upon theoretical calculations of normal compositions and assuming a combustion at 25,000 psig expanded to atmospheric pressure, on a molar percentage basis, was: about 26.5% carbon monoxide; about 19.1% water; about 26.2% carbon dioxide; about 13.7% nitrogen; about 14.2% hydrogen; and about 0.3% other gases.

When the propellant grains 90 of HPC-96 were subjected to a temperature of 120° C., the grains 90 began to discolor within about 40 minutes and ignited within about 5 hours. This reduces the desirability of using the HPC-96 propellant for the propellant grains 90 since one current industry standard requires that a propellant for an inflatable safety system does not degrade substantially when exposed to a temperature of 107° C. for a period of 400 hours, and that the propellant thereafter ignite when exposed to its autoignition temperature. However, the HPC-96 propellant does illustrate certain principles of the present invention and is thus included herein.

With regard to HPC-96 propellant grains 90, about 169 grams of the pressurized medium 36 was provided to the inflator housing 34 and consisted, on a molar percentage basis, of about 5% oxygen and about 95% argon. The inflator 30 had four orifice ports 78 on the orifice sleeve 74 with each having a diameter of about 0.266", and the gas generator nozzle 98 had a diameter of about 0.469". The pressure variation within the inflator housing 34 during operation of the inflator 30 was similar to that presented in FIG. 3, and the pressure within a 100 liter tank fluidly interconnected with the inflator 30 was similar to that illustrated in FIG. 4 and is generally representative of the pressure buildup within the air/safety bag 18. The gaseous output from the inflator 30 included, on a weight percentage basis, about 1.2% carbon monoxide, about 1.5% carbon dioxide, greater than about 2% hydrogen, and about 60 ppm of $NO_x$. Consequently, the use of argon and oxygen in the noted proportions significantly reduced the amount of carbon monoxide and hydrogen when compared theoretical gaseous output of the HPC-96 propellant noted above.

EXAMPLE 2

Figure 3:
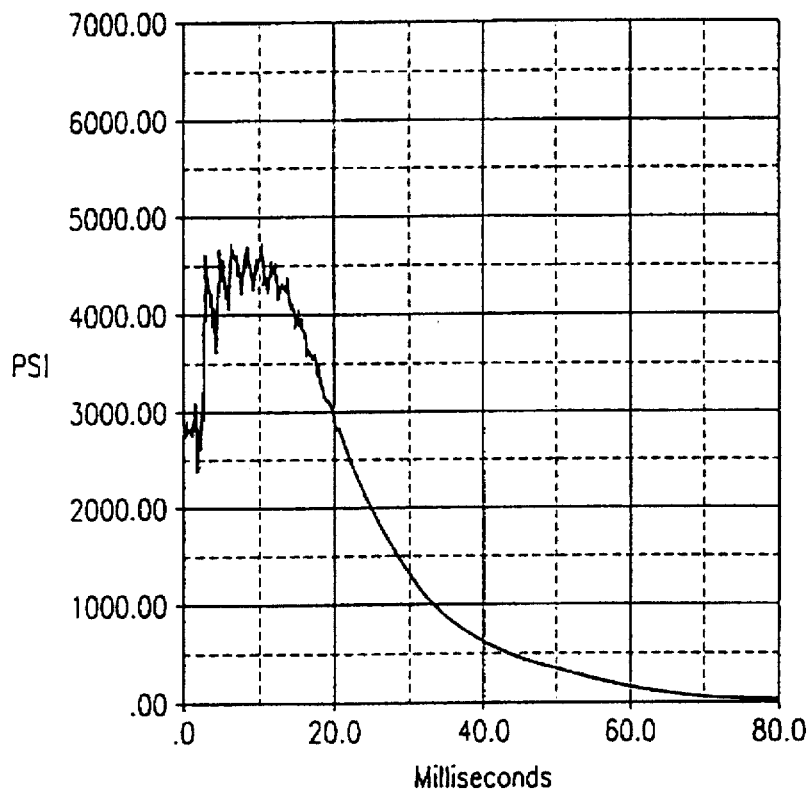
FIG. 3 is an inflator internal pressure versus time performance curve for the propellant composition of Example 2.
Figure 4:
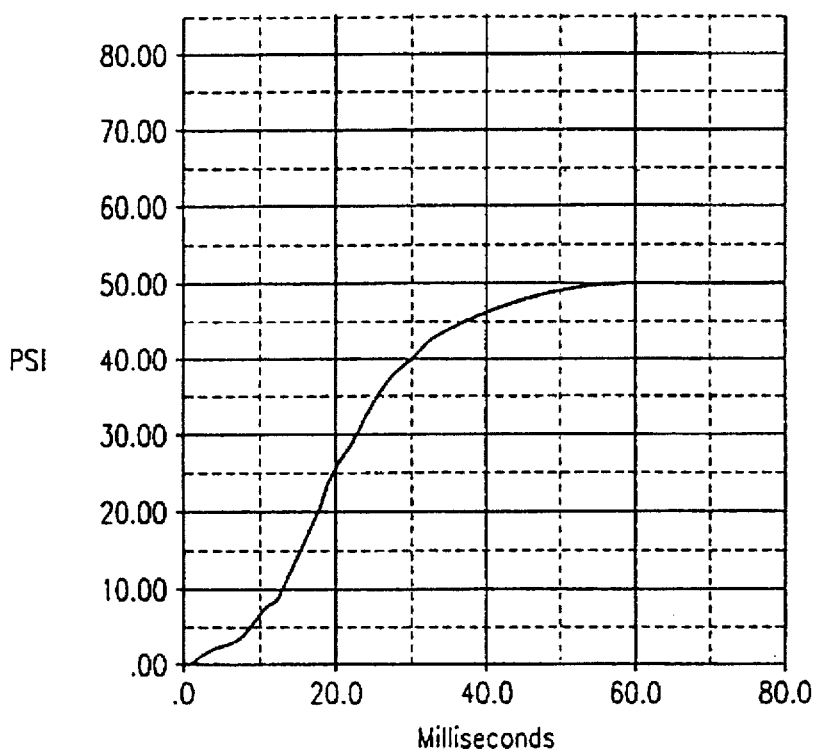
FIG. 4 is a receiving tank pressure versus time performance curve for the propellant composition of Example 2.

The procedure of Example 1 was repeated but 10.4 grams of HPC-96 propellant was used for the grains 90 and about 164.4 grams of a pressurized medium 36 was used with the composition being a molar percentage basis, about 15% oxygen and about 85% argon. The performance curves for the inflator 30 when actuated with these propellant grains 90 are illustrated in FIGS. 3 and 4. Moreover, the gaseous output from the inflator 30 included, on a molar percentage basis, about 2.4% carbon dioxide, about 1000 ppm carbon monoxide, about 70 ppm $NO_x$, about 38 ppm $NO_2$, and about 0 ppm of hydrogen. Consequently, with the increase in the amount of oxygen to 15% from the 5% of Example 1, the amount of carbon monoxide was significantly reduced without an appreciable effect upon $NO_2$. Moreover, this also allowed for the use of significantly less propellant.

EXAMPLE 3

The procedure of Example 1 was repeated twice using 10.4 grams of HPC 96 and 169.0 grams of pressurized medium 36 composed, on a molar percentage basis, of about 15% oxygen and about 85% argon. The performance curves for the inflator 30 were similar to those presented in FIGS. 3-4. Moreover, the gaseous output from the inflator 30 included about 1000 ppm and 800 ppm carbon monoxide, respectively, about 1.0% and 1.2% carbon dioxide, respectively, about 60 ppm and 50 ppm $NO_x$, respectively, and about 23 ppm and 20 ppm $NO_2$, respectively. Consequently, the increase in the amount of oxygen to 15% and the reduction of the amount of HPC 96 reduced the amount of carbon monoxide without an appreciable effect upon $NO_2$. Moreover, the increased amount of oxygen allowed for the use of less propellant.

The foregoing description of the invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known of practicing the invention and to enable others skilled in the art to utilize the invention in such, or other, embodiments and with the various modifications required by the particular applications or uses of the invention. It is intended that the appended the claims be construed to include alternative embodiments to the extent permitted by the prior art.

What is claimed is:

1. A method for assembling an inflator for an inflatable safety system comprising an air/safety bag, said inflator comprising an inflator housing, a gas generator, and an inflator activation assembly, said method comprising the steps of:

positioning a solid gun type propellant inside said gas generator, wherein combustion of said solid gun type propellant augments a flow to the air/safety bag and wherein exposure of said gun type propellant to a temperature of 107 degrees for a period of 400 hours does not degrade said gun type propellant substantially in relation to its suitability for use in said inflator, and thereafter said gun type propellant will ignite when exposed to an autoignition temperature of said gun type propellant;

positioning said gas generator inside said inflator housing;

interconnecting said gas generator and said inflator housing;

interconnecting said inflator activation assembly with said inflator housing, said activation assembly comprising an ignitable material other than said gun type propellant;

introducing a first gas into at least said inflator housing;

introducing a second gas into at least said inflator housing which is different from said first gas, wherein said first and second gases consist essentially of an inert gas and oxygen, respectively; and sealing said inflator housing to substantially retain said first and second gases within said inflator housing, wherein after said sealing step and prior to any activation of said inflator activation assembly, said first and second gases are the only gases contained within said inflator housing and define a pressurized medium.

2. A method, as claimed in claim 1, wherein:

said positioning a gun type propellant step comprises positioning from about 10 grams to about 12 grams of said gun type propellant within said gas generator.

3. A method, as claimed in claim 1, wherein:

said positioning a gun propellant step comprises positioning less that about 15 grams of said gun type propellant within said gas generator.

4. A method, as claimed in claim 2, wherein:

said method further comprises the step of pressurizing said inflator housing with an amount of said first and second gases ranging from about 150 grams to about 190 grams using said introducing a first gas and introducing a second gas steps.

5. A method, as claimed in claim 1, wherein:

said method further comprises the step of selecting an amount of said pressurized medium for said introducing first and second gases steps and selecting an amount of said gun type propellant for said positioning step, whereby a ratio of a weight of said pressurized medium to a weight of said gun type propellant is within at least one of first and second ranges, said first range being from about 14 to about 18 and said second range being greater than about 15.

6. A method, as claimed in claim 5, wherein:

said selecting step comprises selecting a gun type propellant having a composition, on a weight percentage basis, of about 76.0% hexahydrotrinitrotriazine, about 12.0% percent cellulose acetate butyrate, about 4.0% nitrocellulose of which about 12.6% is nitrogen, about 7.60% acetyl triethyl citrate, and about 0.4% ethyl centralite.

7. A method, as claimed in claim 1, wherein:

said first gas is argon and said second gas is oxygen, said first and second gases are a pressurized medium, said introducing a first gas step comprises, on a molar basis, introducing about 70% to about 90% of said pressurized medium with said argon, and said introducing a second gas step comprises, on a molar basis, introducing about 10% to about 30% of said pressurized medium with said oxygen.

* * * * *